United States Patent [19]

Takeuchi et al.

[11] Patent Number: 4,851,934
[45] Date of Patent: Jul. 25, 1989

[54] ANALOG SIGNAL SYNTHESIZING PROCESSING CIRCUIT WITH PERIODIC NOISE COMPENSATION

[75] Inventors: Hisaharu Takeuchi, Fukaya; Teruo Itami, Tokyo, both of Japan

[73] Assignee: Kabushiki Kaisha Toshiba, Kawasaki, Japan

[21] Appl. No.: 95,953

[22] Filed: Sep. 14, 1987

[30] Foreign Application Priority Data

Sep. 30, 1986 [JP] Japan ................................ 61-231893

[51] Int. Cl.$^4$ ............................................ G11B 15/14
[52] U.S. Cl. ........................................ 360/64; 360/32; 360/38.1; 381/94; 341/118
[58] Field of Search .......................... 360/64, 32, 38.1; 340/347 CC; 358/336, 340; 381/94; 328/162, 165; 307/443, 572

[56] References Cited

U.S. PATENT DOCUMENTS

| 4,025,721 | 5/1977 | Graupe et al. | 381/47 |
| 4,309,726 | 1/1982 | Tanaka et al. | 360/32 |
| 4,327,382 | 4/1982 | Tanaka | 360/13 |
| 4,549,229 | 10/1985 | Nakano et al. | 360/64 X |
| 4,587,573 | 5/1986 | Odaka | 360/19.1 X |
| 4,651,230 | 3/1987 | Hagita et al. | 360/38.1 X |
| 4,669,000 | 5/1987 | Odaka et al. | 360/32 |
| 4,704,642 | 11/1987 | Namiki | 360/64 |
| 4,726,067 | 2/1988 | Alonso | 360/32 X |
| 4,772,959 | 9/1988 | Amano et al. | 360/32 X |

FOREIGN PATENT DOCUMENTS

| 0160309 | 12/1980 | Japan | 360/19.1 |
| 0052879 | 4/1986 | Japan . | |
| 0139966 | 6/1986 | Japan | 360/64 |
| 0177607 | 8/1986 | Japan . | |

OTHER PUBLICATIONS

Schulz et al., "Analog-to-Digital Converter with Noise Rejection", IBM Tech. Dis. Bulletin, vol. 15, No. 6, Nov. 1972, pp. 2007-2008.

Primary Examiner—Eugene R. LaRoche
Assistant Examiner—Seung Ham
Attorney, Agent, or Firm—Cushman, Darby & Cushman

[57] ABSTRACT

An analog signal synthesizing processing circuit with a periodic noise compensation generates analog signal of a plurality of audio signals and so forth containing noise generated almost periodically, for example by head switching of VTR, and plurality of analog signals containing the noise are phase-synchronized with given sampling clock signal and phase synchronizing circuit by timing oscillating circuit, the phase-synchronized signal is output from reproductive audio signal processing circuit, converted into digital signal by analog-digital converter and the noise contained in this converted signal is approximated from its preceding and following signal by compensation processing circuit and this approximated signal is converted into analog signal by digital-analog converter.

15 Claims, 8 Drawing Sheets

ANALOG SIGNAL SYNTHESIZING PROCESSING CIRCUIT WITH PERIODIC NOISE COMPENSATION

BACKGROUND OF THE INVENTION

The present invention relates generally to an analog signal synthesizing processing circuit and, more particularly, to an analog signal synthesizing processing circuit which can periodically perform noise compensation.

Most video tape recorders (hereinafter called "VTR"), such as home-use helical scanning VTRs, have two rotary heads. These heads are mounted on the periphery of a rotary drum and located diametrically opposite to each other. Either head can reproduce signals from a magnetic tape when it is in a sliding contact with the tape.

A signal reproduced by the first rotary head must be combined with that reproduced by the second rotary head, thereby to provide a continuous signal. In order to combine these signals, it is necessary to alternately select the output signals of the two heads. More precisely, the two heads must be alternately switched. This technique is called "head switching". When the head switching is carried out, however, FM carriers will become discontinuous, and noise, generally known as "switching noise", will inevitably be generated. The switching noise is virtually no problem in reproducing image signals since the head switching can be performed during the blanking period. The noise is a great problem in reproducing audio signals since the audio signals have no blanking periods. The quality of the reproduced audio signals is influenced very much by the switching noise.

Accordingly, most high-fidelity VTRs now on sale are provided with an apparatus for removing switching noise. This apparatus replaces the switching noise with signals containing no noise, such as a fixed-level signal generated immediately preceding the noise, a signal having a level or slope estimated from the level or slope of a signal immediately generated preceding the noise, or a signal generated by another reproduction system in which the head switching is performed at different timing. The noise-removing apparatus has a drawback, however. Since it employs analog processing to replace the switching noise with a signal other than the audio signal, the efficiency of removing the switching noise changes in accordance with the frequency of the audio signal.

An apparatus which performs digital processing to remove switching noise has been invented, as is disclosed in Japanese Utility Model Disclosure Sho 61-52879. In this apparatus, a clock signal synchronous with the timing of the head switching is delayed and is used, as a sampling clock signal, thereby sampling the audio signal (i.e., an analog signal). Also in this apparatus, the sampling period is made longer than the noise-generating period, and sampling of the noise is inhibited, thereby to remove the switching noise. Since the sampling period is relatively long, the reproduced analog audio signal will, in some cases, have a waveform greatly different from that of the original audio signal. If the sampling period is shortened in order to reduce this difference, there will be the possibility that the switching noise is adversely sampled and cannot be removed.

SUMMARY OF THE INVENTION

Accordingly, it is an object of the present invention to provide an analog signal synthesizing processing circuit with a periodic compensation.

The present invention relates to the constitution removing noise by digital treatment, which not only approximates the noise by using its preceding and following signal components but also phase-synchronizes such a operation causing generation of noise as head switching operation with the sampling clock of analog signal. That is, the present invention comprises signal oscillating means for generating plurality of analog signals containing noise generated almost periodically, synthesizing means for synthesizing plurality of analog signals containing the noise generated by the signal oscillating means, phase synchronizing means for synchronizing a synthesizing operation of the synthesizing means with given sampling clock signal, analog-digital converting means for converting the signal outputted from the synthesizing means into digital signal in response to the sampling clock signal supplied to the phase synchronizing means, signal output approximating means for approximating the noise contained in converted signal obtained by the analog-digital converting means with reference to both preceding and following signals and digital-analog converting means for converting approximated signal outputted from the signal output approximating means into analog signal.

BRIEF DESCRIPTION OF THE DRAWINGS

These and other features and advantages of the present invention will become more apparent from the following detailed description of exemplary embodiments as illustrated in the accompanying drawings in which.

DETAILED DESCRIPTION OF THE PREFERRED EMBODIMENTS

Figure 1:
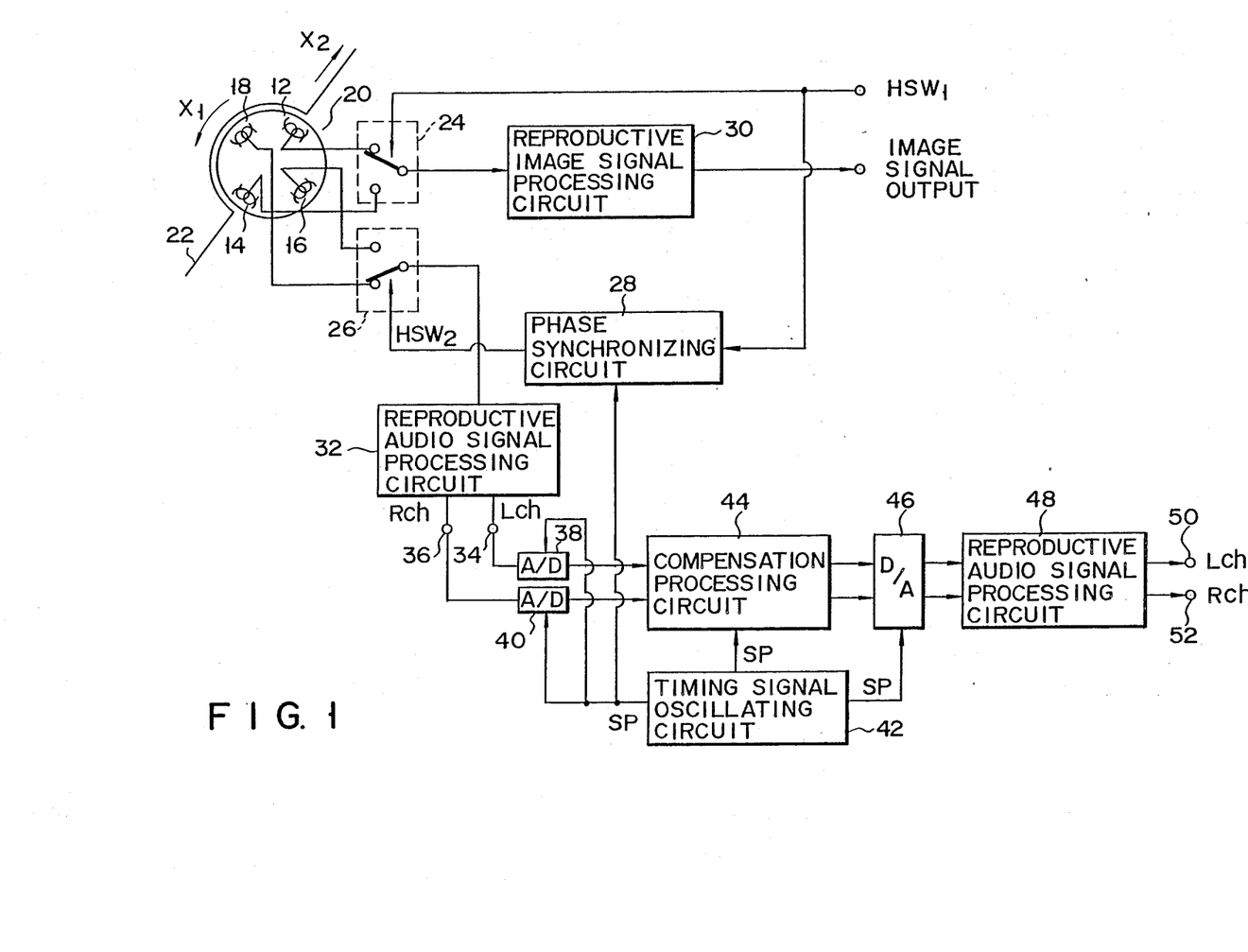
FIG. 1 is a schematic block diagram showing first embodiment of the invention.

Referring to the drawings, the description of preferred embodiment of the present invention is given below. FIG. 1 shows a schematic block diagram of the present invention and is applied to the removing apparatus of switching noise for VTR of VHS high fidelity system record-reproducing by frequency modulation of audio signal.

As far as VHS high fidelity system is concerned, at least 2 pairs of record-reproduction heads for image and audio are necessary, because audio signal is deep recording system and recorded on a magnetic tape. FIG. 1 shows the most simplest constitution consisting of 4 heads, 2 heads for image and 2 heads for audio.

2 heads 12 and 14 for image and 2 heads 16 and 18 for audio are faced and mounted on rotary drum 20 at 180° respectively. In this case, the said heads 12 and 14 for image and the heads 16 and 18 for audio are to be mounted with the angle of 90° each. And the rotary drum 20 is rotated in the direction of arrow $X_1$ as shown and magnetic tape 22 is sent out in the direction of arrow $X_2$ as illustrated, so that the said each head may make slide-contact sequentially at the same time. By operating so, the heads 12 and 14 for image and the heads 16 and 18 for audio trace image track and audio track on magnetic tape 20 each. The image signal and audio signal reproduced by this tracing are provided to switch 24 and 26 respectively.

Figure 2A:
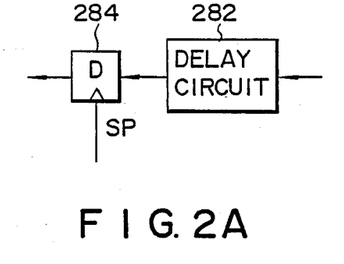
FIG. 2A through 2G are drawings showing constitutions of phase synchronizing circuits of apparatus of FIG. 1.

The said switch 24 for image signal is controlled by head switching pulse signal $HSW_1$ from the outside. To the contrary, the switch for audio signal is controlled as following. That is, because rotating phases of heads 16 and 18 for audio are delayed by 90° each than the heads 12 and 14 for image, the switch 26 is to be controlled by head switching pulse signal $HSW_2$ delaying the head switching pulse signal $HSW_1$ by 90° by phase synchronizing circuit 28. The phase synchronizing circuit 28 is to delay the phase of the head switching pulse signal $HSW_1$ by 90° and, for example comprises delay circuit 282 and flip-flop circuit 284, as shown in FIG. 2A. The head switching pulse signal is to synchronize with rotate-driving of rotary drum 20.

And the image signal output from switch 24 for image signal receives the treatment of demodulation etc. by reproductive image signal processing circuit 30 and is made to reproduce the signal before recording. On the one hand, the audio signal output from the switch 26 for audio signal is sent to reproductive audio signal processing circuit 32 and its band is limited. Then the signal is divided into left channel (Lch) and right channel (Rch). And after the signals divided into two are demodulated, they are induced to terminals 34 and 36. Two audio signals induced to terminals 34 and 36 are input in analog-digital converters (hereinafter to be marked as A/D converter) 38 and 40. This A/D converters 38 and 40 sampling-hold input audio signal at rise timing of sampling clock signal SP output from timing signal oscillating circuit 42 and quantize this signal. Then the said timing signal oscillating circuit 42 outputs sampling clock signal SP to the phase synchronizing circuit 28 also.

The audio signal digitalized by the said quantizing is input in compensation processing circuit 44 and is to remove noise. The audio signal where the noise has been removed by the compensation processing circuit 44 returns to analog signal again by digital-analog converter (hereinafter to be marked as D/A converter) 46. And the analog signal is sent out to terminals 50 and 52, after treating noise reduction by second reproductive audio signal processing circuit 48.

Moreover, here the filter removing unnecessary band components, before A/D converters 38 and 40 or after D/A converter 46, is not shown. In addition, timesetting delay circuit etc. can be added to in compliance with the necessity of operation timing, as not shown.

Figure 3:
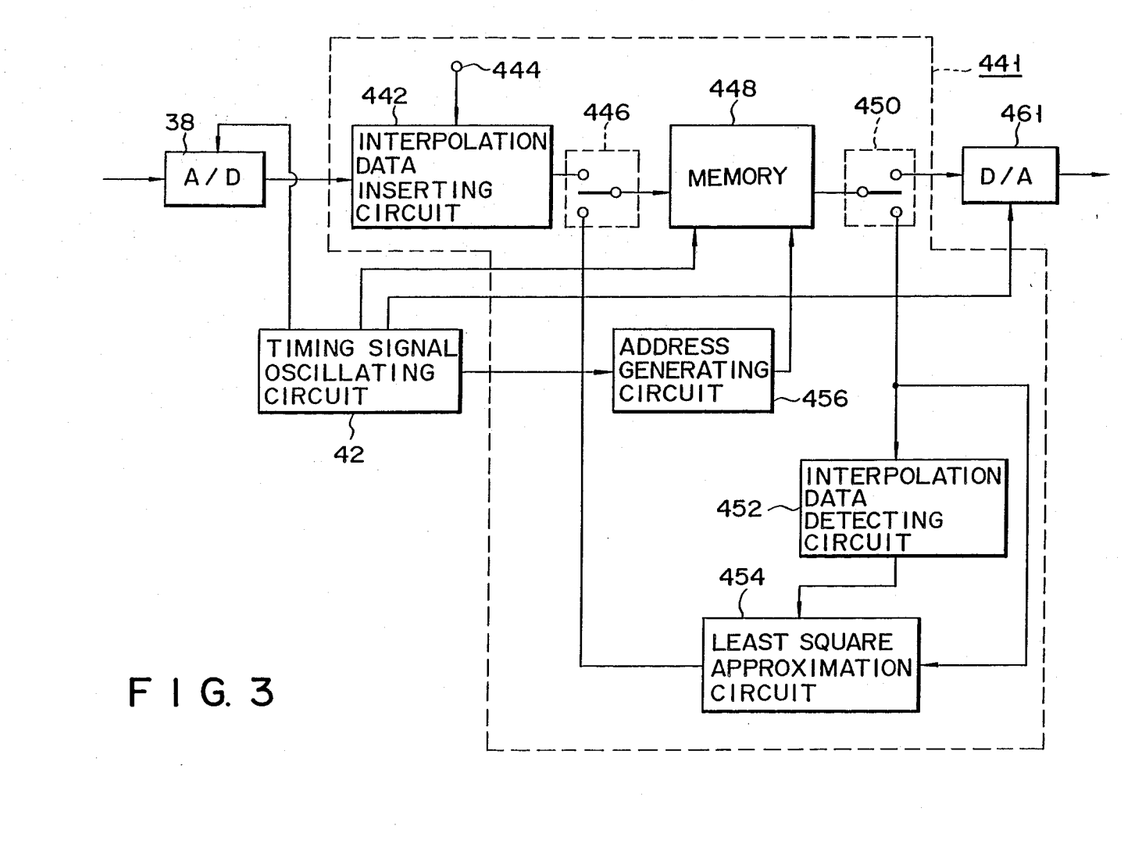
FIG. 3 is of compensation processing circuit of circuits shown in FIG. 1 and a schematic block diagram of its periphery.

And the compensation processing circuit 44 removes noise by approximating noise period by its preceding and following signals and is constituted as shown in FIG. 3, for example.

Take L channel, for instance, the signal converted into digital data by A/D converter 38 is supplied to interpolation data inserting circuit 442. The timing signal of switching noise is supplied through input terminal 444 to the interpolation data inserting circuit 442.

Here the interpolation data inserting circuit 442 make a operation replacing the digital data of switching noise part with given interpolation data. And the replaced digital data is supplied to memory 448 through switch 446 and is memorized.

The data memorized in memory 448 are read through switch 450, supplied to interpolation data detecting circuit 452 and interpolation data are detected additionally by the interpolation data inserting circuit 442. And the data read from memory 448 are supplied to interpolation data detecting circuit 452 and least square approximation circuit 452 too. Moreover, the interpolation timing signal detected by interpolation data detecting circuit 452 is supplied to least square approximation circuit 454, which supplies its output to the switch 446.

In addition, signal is supplied from timing signal oscillating circuit 42 outside compensation processing circuit 441, to the A/D converter 38 and D/A converter 461. The signal is further supplied directly as well as through address generating circuit 456 to the memory. Please note that the detail of R channel will be omitted, since R channel has the same structure as L channel.

If time-sharing technique is used, the circuit shown in FIG. 3 can be used for both the L channel and the R channel.

The following is the description on operation of periodic noise-removing apparatus thus constituted.

When image and audio are reproduced, rotary drum 20 is rotate-driven in the direction of $X_1$ and magnetic tape 22 is sent out in the direction $X_2$. By operating so, the heads 12 and 14 for image and 16 and 18 for audio trace image track and audio track on magnetic tape 22 respectively.

The image signal and audio signal thus reproduced are given to switches 24 and 26 each.

Figure 4A:
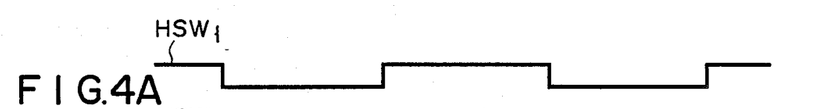
FIGS. 4A, 4B, and 4C are operation illustrations of apparatus of FIG. 1.
Figure 4B:
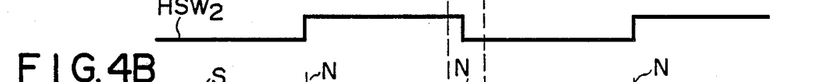

Here these switches 24 and 26 are to be controlled by the signals of head switching pulse signal for image $HSW_1$ and head switching pulse signal for audio $HSW_2$, as shown in FIGS. 4A and 4B.

Rotary drum 20 has on its periphery a pair of image heads and a pair of audio heads, the heads of each pair being spaced apart from each other by 180°. The pair of image heads are switched between each other by switch 24 to select a head tracing magnetic tape 22, so that the reproduction output of one image head is connected with that of the other to make a continuous image signal. In the same way, the pair of audio heads are switched between each other by switch 26 to select a head tracing magnetic tape 22, so that the reproduction output of one audio head is connected with that of the other to make a continuous audio signal. Namely, the switch 24 for image is controlled by head switching pulse signal $HSW_1$. On the one hand, the switch 26 for audio is controlled by head switching pulse signal $HSW_2$, the phase of which is delayed than head switching pulse signal $HSW_1$ by 90° by phase synchronizing circuit 28. Thus the image signal output from switch 24 is reproduced as the signal before recording by reproductive image signal processing circuit 30, after treatment of demodulation and so forth being received. And the audio signal output from switch 26 for audio signal is sent to reproductive audio signal processing circuit 32 and is divided into signal of Lch and signal of Rch, after its band is limited. And the signals divided into two are induced to terminals 34 and 36, after being demodulated.

Figure 4C:
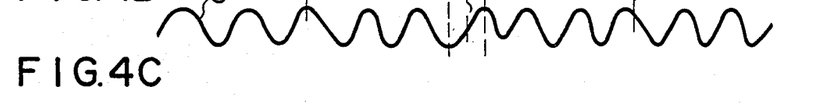
Figure 5A:
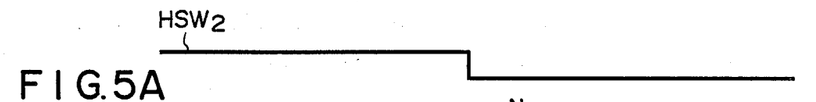
FIGS. 5A and 5B are operation illustrations enlarging a part of 4B and 4C each.
Figure 5B:
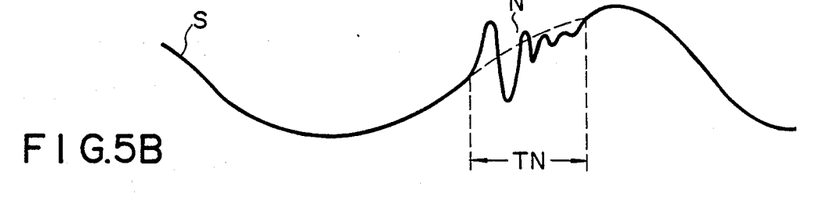

Here, if the audio signal induced to the terminals 34 or 36 is taken as S, its wave form becomes as shown in FIG. 4C, for example. And FIGS. 5A and 5B show the enlarged parts within dotted lines shown in FIGS. 4B and 4C. Here, N in drawings stands for switching noise superposed in audio signal S.

As before stated, FM carrier of audio signal output from switch 26 discontinues, as the connecting state of switch 26 is switched by the control of head switching pulse signal $HSW_2$. The switching noise N is generated, when the above discontinuous part is demodulated.

Figure 6A:
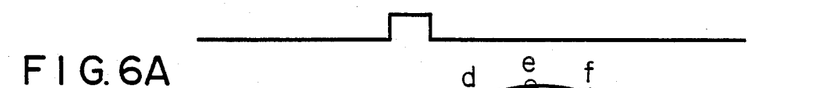
FIGS. 6A, 6B and 6C are operation illustrations of compensation processing circuit of FIG. 3.
Figure 6B:
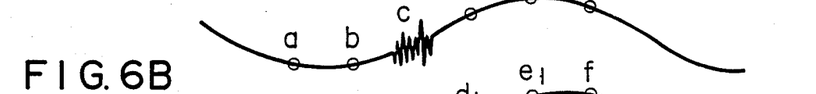

Two audio signals induced to the terminals 34 and 36 are input in A/D converters 38 and 40. These A/D converters 38 and 40 quantize input audio signal, after sampling-holding the signal at rise timing of sampling clock signal SP output from timing signal oscillating circuit 42. And the audio signal digitalized by the quantizing is input in the interpolation data inserting circuit 442 in compensation processing circuit 44 (441 in FIG. 3) and is replaced with given interpolation data. Namely, supposing that switching noise is being generated, switching noise timing signal rises to a high-level as shown in FIG. 6A and the data of point C are lacking, for example, of sampling points a through f of audio reproduction signal as shown in FIG. 6B, then, as above-mentioned, the point C part of switching noise of audio signal input in interpolation data inserting circuit 442 is replaced with given interpolation data. And the digital data replaced with the interpolation data are memorized in memory 448 through switch 446. Further, the digital data memorized in the memory 448 are read through switch 450 and are supplied to interpolation data detecting circuit 452 and least square approximation circuit 454. Interpolation data detecting circuit 452 detects interpolation data substituted by interpolation data inserting circuit 442 and supplies interpolation timing signal to least square approximation circuit 454.

Least square approximation circuit 454 determines a portion of the data to be compensated (sampling point c) with reference to the interpolation timing signal, and corrects through least square approximation by using the data of two sampling points a and b preceding the sampling point c and the data of three sampling points d, e and f following the sampling point c.

Figure 6C:
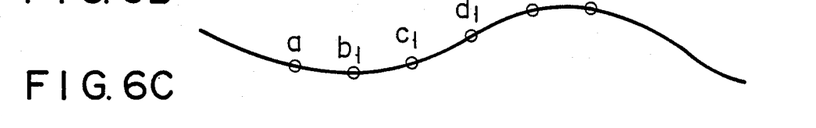

Namely, the circuit corrects by replacing the data of sampling points b, c, d and e with the data shown with points $b_1$, $c_1$, $d_1$ and $e_1$, as shown in FIG. 6C.

Here, the least square approximation circuit 454 is to correct interpolation data parts by tertiary least square approximate calculation as shown with the following expression.

$$Y'_i = \Sigma a_{ij} Y_{ij} / b_i$$

(but $a_{ij}$ and $b_i$ are constants, $Y_{ij}$ are input digital data and $Y'_i$ are presumptive data). And in the above-mentioned case, supposing that points a through f are 1 through 6 each, following formulas are obtained.

$i = 2, 3, 4, 5$ $j = 1, 2, 4, 5, 6$

Thus the connected parts between original digital parts and data parts mute-treated is corrected to become smooth by the least square approximation circuit 454.

By doing so, the data corrected by least square approximation circuit 454 are re-memorized in address where interpolation data have been memorized before memory 448 through switch 446 in response to switching noise period. Hereafter the data read digital data containing corrected data from memory 448 and supply them to D/A converter 46 through switch 450 again.

Here the converting operation of A/D converters 38 and 40 and D/A converter 46, read/write of memory 448, switching operation of switches 446 and 450 and so forth are controlled by many kind of timing signals output from timing signal oscillating circuit 42. And address of memory 448 is to be generated by address generating circuit.

Figure 7A:
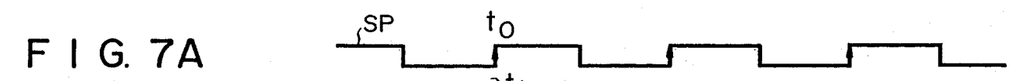
FIGS. 7A through 7D and FIGS. 8A through 8D are operation illustrations of circuit of FIG. 1.
Figures 7B, 7C:
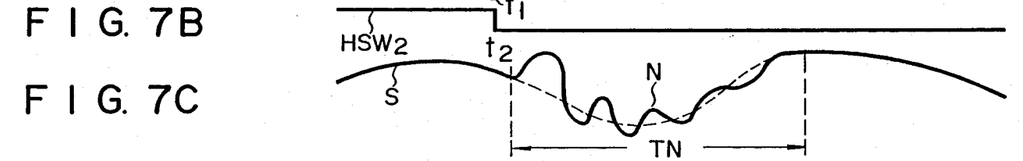

But the present invention phase-synchronizes output of head switching pulse signal $HSW_1$ with sampling clock signal SP of timing signal oscillating circuit 42, for example, by flip-flop circuit 284 in phase synchronizing circuit 28 and is to supply head switching pulse signal $HSW_2$ to switch 26 by this operating. Let's suppose a time point of sampling clock signal SP of timing signal oscillating circuit 42 is $t_o$, as shown in FIG. 7A, as to this constitution. And as shown in FIG. 7B, head switching timing $t_1$ of switch 26 by head switching pulse signal $HSW_2$ synchronizes with sampling timing of the head sampling clock signal SP. On the one hand, timing $t_2$, when switching noise N is generating, is delayed a little than head switching timing $t_1$. Accordingly sampling timing $t_o$ of audio signal can be always set up just preceding noise period TN.

Figure 7D:
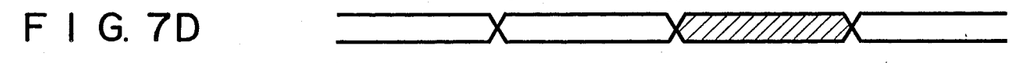

By this operation sampling number of noise period TN can be decreased as many as possible (for example, only one part of oblique lines shown in FIG. 7D). In consequence, data to be corrected decrease, can keep noise removing ability from decreasing as much as possible and further constitution of compensation processing circuit 44 becomes more simpler.

Figure 8A:
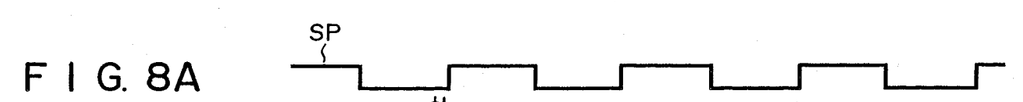
Figures 8B, 8C:
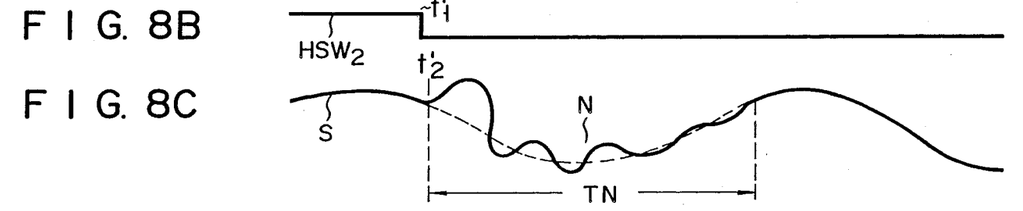
Figure 8D:
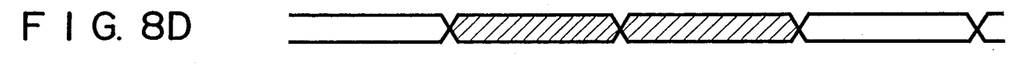

Here supposing that head switching pulse signal $HSW_2$ of switch 26, as shown in FIG. 8B, is not synchronized with sampling clock signal SP as shown in FIG. 8A, then timing $t'_2$, when switching noise N of audio signal S as shown in FIG. 8C is generated, is delayed a little than head switching timing $t'_1$ of switch 26. But sampling timing of audio signal S can't be set up always just preceding noise period TN, because head switching pulse signal $HSW_2$ doesn't synchronize with sampling clock signal SP. Therefore sampling number of noise period TN increases (for example, two parts of oblique lines in FIG. 8D) and noise removing ability decreases.

Therefore even though sampling period is shortened, sampling number of noise period TN is decreased as much as possible, noise removing ability can be improved and signal restoration of high frequency can be made with less error, by synchronizing head switching time of switch 26 by head switching pulse signal $HSW_2$ with sampling timing of sampling clock signal SP. And according to the embodiment, compensation processing circuit and flip-flop circuit may be added to conventional circuit. Moreover circuit constitution can be simplified drastically, as compared with the apparatus, which was stated in the Japanese Utility Model laid open No. 1986-52879, using phase-locked loop circuit, in order to synchronize sampling clock with head switching pulse.

And there is a defect that the same modulation is given in case of D/A conversion and signal deteriorates by receiving FM modulation, because sampling pulse receives modulation in response to the change of head switching pulse, when phase-locked loop circuit is used. The above-mentioned defect can be improved.

Figure 9:
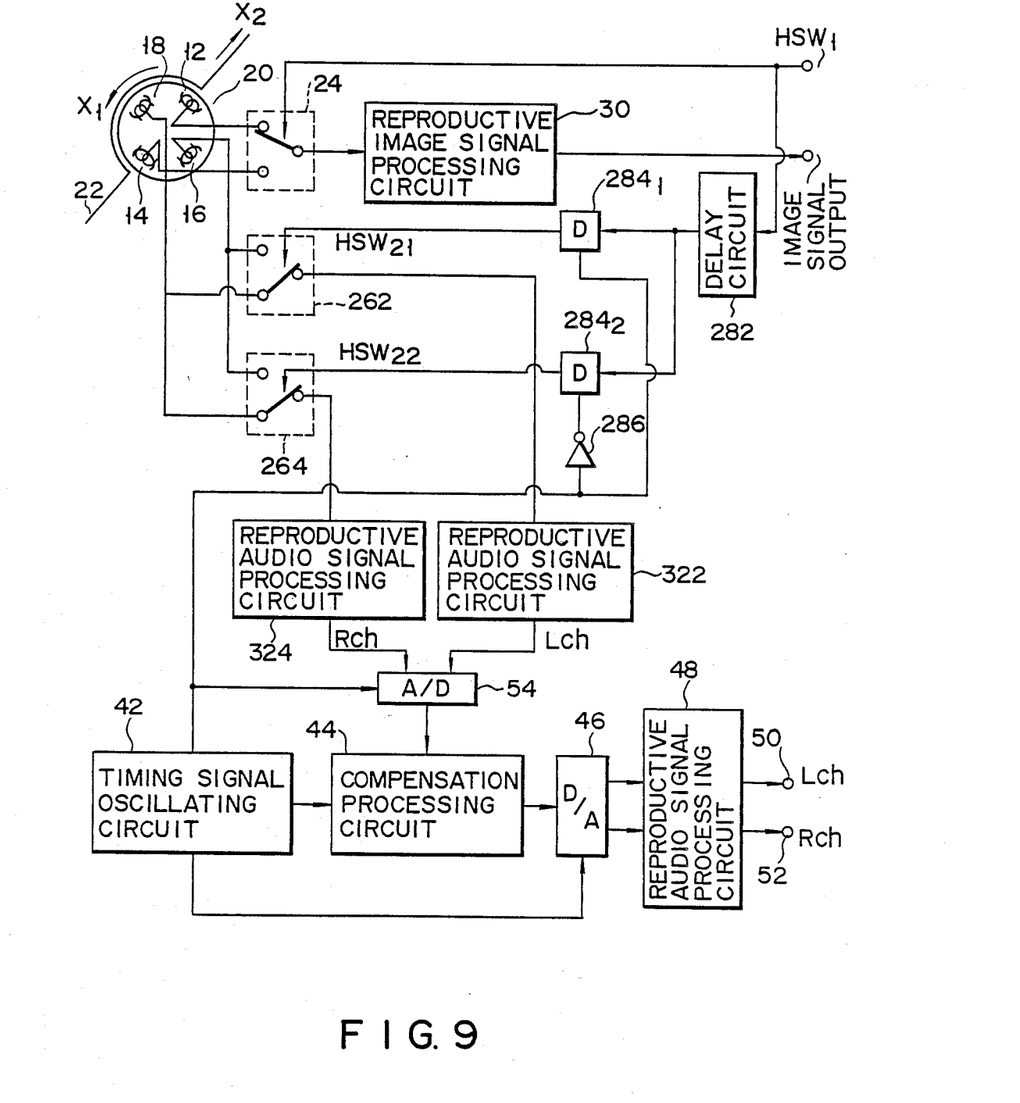
FIG. 9 is a schematic block diagram showing second embodiment of the invention.

FIG. 9 is a schematic block diagram showing the constitution of second embodiment of the present invention. First embodiment deals with simultaneous digital signalizing of analog audio signal of L channel and R channel but this second embodiment deals with mutual digital signalizing of signal of the both channels.

As for FIG. 9, audio signal reproduced by heads 16 and 18 for audio is input in switches 262 and 264 respectively.

And head switching pulse signal $HSW_1$ is output to flip-flop $284_1$ or $284_2$ through delay circuit 282. Then the switches 262 and 264 are controlled by head switching pulse signals $HSW_{21}$ and $HSW_{22}$ output from these flip-flops $284_1$ and $284_2$. The audio signal selected mutually by these switches 262 and 264 is input in reproductive audio signal processing circuits 322 and 324.

But head switching pulse signal $HSW_{21}$ controlling switch 262 is the pulse phase-synchronized at rise timing of sampling clock signal SP from timing signal oscillating circuit 42 by flip-flop $284_1$. On the contrary, head switching pulse signal $HSW_{22}$ controlling 264 is the pulse phase-synchronized at rise timing of clock inverting sampling clock signal SP by inverter circuit 286, that is, at fall timing of sampling clock signal SP, by flip-flop $284_2$.

The audio signal input in reproductive audio signal processing circuits 322 and 324 respectively is quantized mutually by A/D converter 54 and is converted into digital signal, after receiving band limiting and demodulation treating.

The explanation of those circuit compositions and their operations that are similar to the first embodiment shown in FIG. 1 is skipped.

Figure 10A:
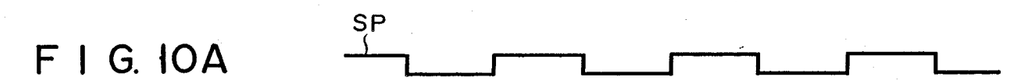
FIGS. 10A through 10G are operation illustrations of apparatus of FIG. 9.
Figure 10B:
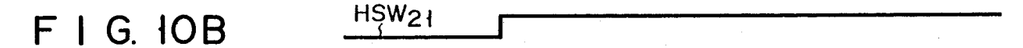
Figure 10C:
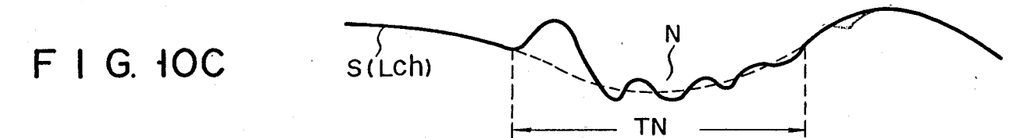

As for L channel set up at rise timing of sampling clock signal SP as shown in FIG. 10A, the head switching timing of switch 262 by head switching pulse signal $HSW_{21}$ is synchronized with the rise timing of sampling clock signal SP, as shown in FIG. 10B. Then the timing, when the noise of audio signal of L channel is generated, is delayed a little than the head switching timing of switch 262, as shown in FIG. 10C.

Figure 10D:
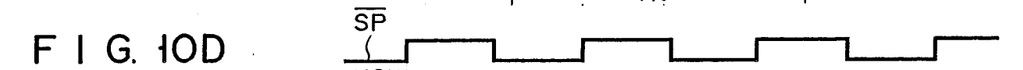
Figures 10E, 10F:
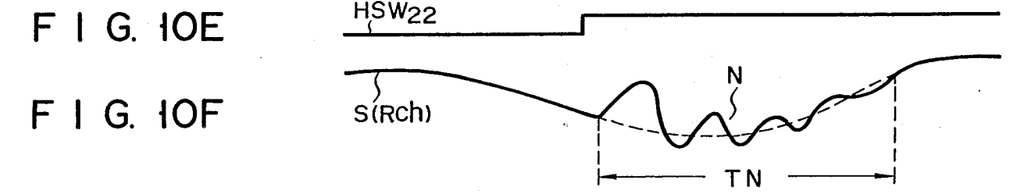

On the contrary, as to R channel, the head switching timing of switch 264 by head switching pulse signal $HSW_{22}$ is synchronized with rise timing of sampling clock signal $\overline{SP}$ as shown in FIG. 10D, that is, with the fall timing of the sampling clock signal SP as shown in FIG. 10E. At this time, the timing, when the noise of audio signal of R channel is generated, is delayed a little than head switching timing of switch 264, as shown in FIG. 10F.

Figure 10G:
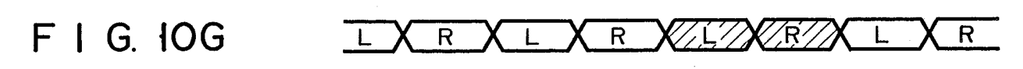

And in this case, sampling data are alternated with L channel and R channel, for example, as shown in FIG. 10G, because the signals between L channel and R channel are quantized mutually by A/D converter 54 (L and R in the drawing show channel respectively). Accordingly, sampling number of noise period TN in the embodiment can be restrained, for example, from one of L channel or R channel respectively (part of oblique lines in FIG. 10G).

Here, supposing that head switching pulse signal $HSW_2$ for audio is synchronized with rise timing of sampling clock signal SP, as above-mentioned first embodiment, it results as follows. That is, as for L channel quantized at rise timing of sampling clock signal SP, sampling number of noise period TN is one in the example of FIG. 7D, but as for R channel quantized at fall timing of sampling clock signal SP, sampling number of noise period TN can be two in the example of the FIG. 7D. Contrarily, in case that head switching pulse signal $HSW_2$ is synchronized with fall timing of sampling clock signal SP, the result becomes contrary to the above case. That is, sampling number of noise period TN of L channel is one and sampling number of noise period TN of R channel can be two. Therefore, in the embodiment, the sampling number of noise period TN is decreased by adding flip-flop circuits and so forth for L and R channels.

And FIGS. 2B through 2G show other constitution of phase synchronizing circuit 28 shown in FIG. 1 but the illustration is skipped, since its operation is same basically.

Figure 2B:
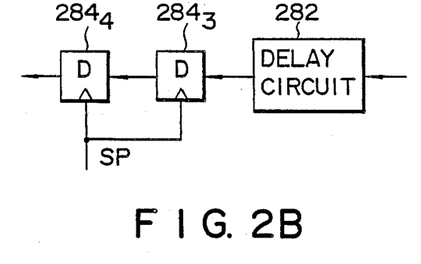
Figure 2C:
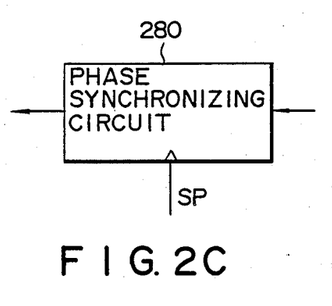

That is, FIG. 2B shows multi-stage constitution of flip-flop circuit shown in FIG. 2A. Head switching pulse signal $HSW_1$ is output to flip-flop circuit $284_3$ through delay circuit 282. Then the signal output from this flip-flop circuit $284_3$ is output to flip-flop circuit $284_4$ connected with serial and further is supplied to switch 26. At this time sampling clock signal SP is input in the flip-flop circuits $284_3$ and $284_4$ from timing signal oscillating circuit 42 outside. And FIG. 2C shows phase synchronizing circuit 280 integrating multi-stage constituted flip-flop circuit and delay circuit as shown in FIG. 2B and sampling clock signal SP is input in the circuit from timing signal oscillating circuit 42.

Figure 2D:
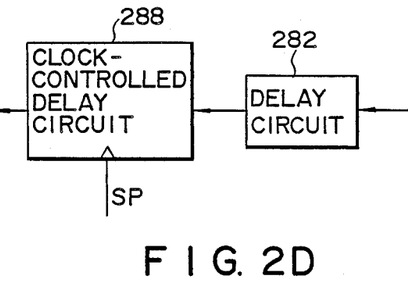

Further, FIG. 2D can replace flip-flop circuit 284 shown in FIG. 2A with clock-controlled delay circuit 288 of BBD or CCD and so forth. As for FIG. 2E, the signal output from delay circuit 282 and sampling clock signal SP output from timing signal oscillating circuit 42 are to be input in counter 290.

Figure 2E:
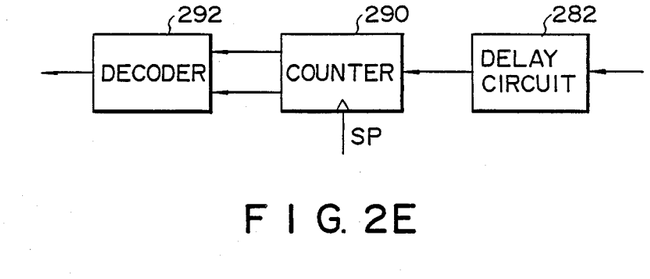

And signal is supplied from this counter 290 and according to the supply, decoder 292 supplies signal to switch 26.

Figure 2F:
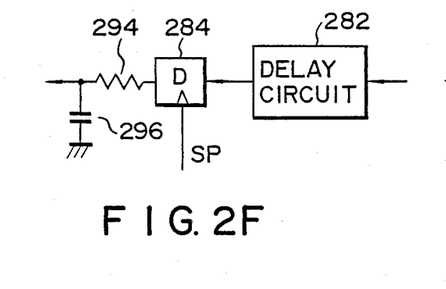
Figure 2G:
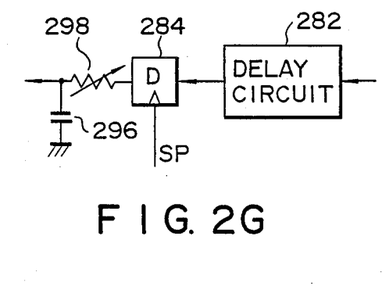

Further, FIGS. 2F and 2G are the drawings showing the addition of phase adjusting circuits to circuits in FIG. 2A. That is, flip-flop circuit 284 receives signal from delay circuit 282 and timing signal oscillating circuit 42. And as for FIG. 2F, the signal from flip-flop circuit 284 is supplied to switch 26 through integration circuit comprising resistor 294 and capacitor 296. On the one hand, FIG. 2G is the same as the constitution of FIG. 2F, except that variable resistor 298 is used by half-fixing the part of resistor 294 of the integration circuit.

Figure 11:
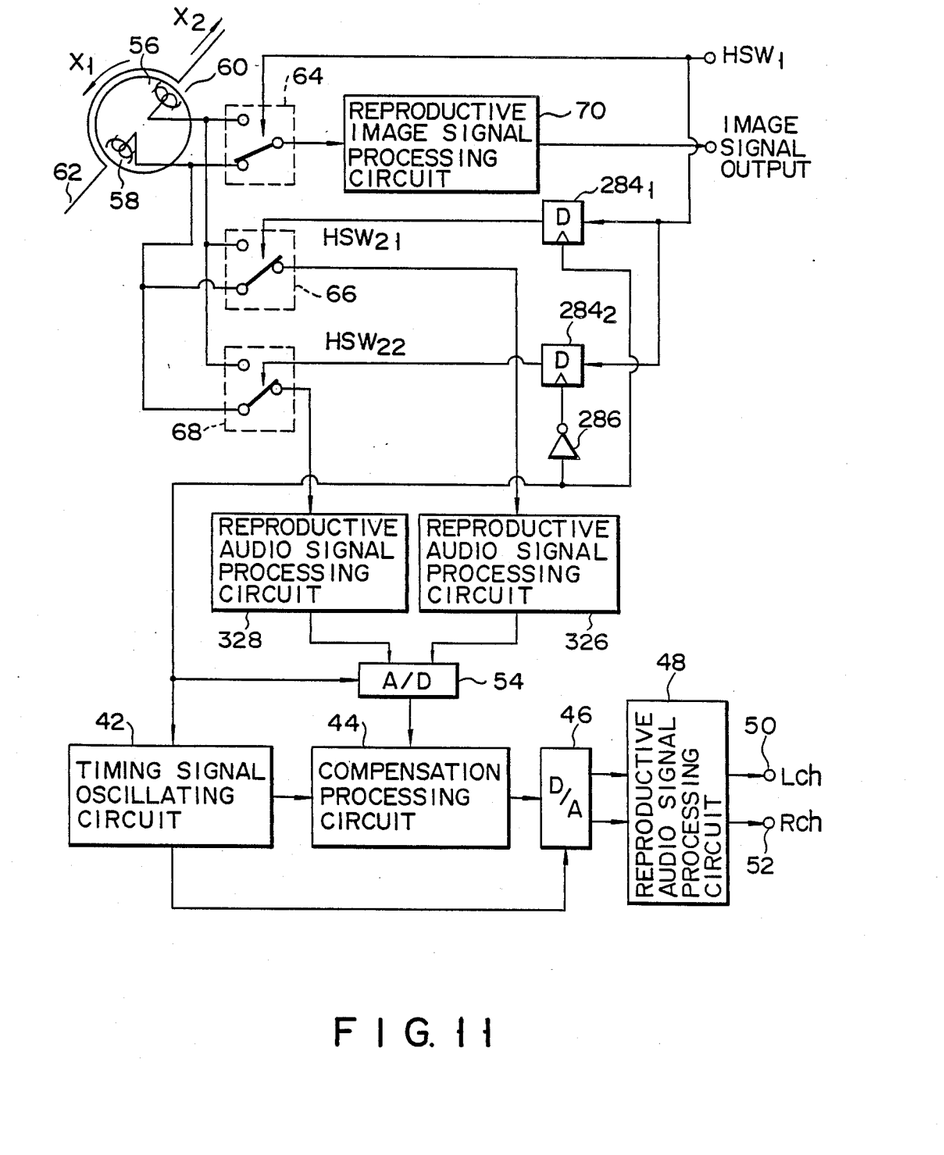
FIG. 11 is a schematic block diagram showing third embodiment of the invention.

The above first and second embodiments relate to VTR of VHS system, but are not always limited to the system and can be applied to VTR of Beta Format also. Referring to FIG. 11, in case of two heads constitution, heads 56 and 58 for both image and audio are mounted the periphery of rotary drum 60 and located diametrically opposite to each other. And when the rotary drum 60 is rotate-driven in the direction of arrow $X_1$ as shown in FIG. 11, magnetic tape 62 is sent out simultaneously in the direction of arrow $X_2$ as shown in FIG. 11. By this operating, the heads 56 and 58 trace image track and audio track on the magnetic tape 62. Thus, reproduced image signal and audio signal are given to switch 64, switches 66 and 68 respectively.

Then, head switching pulse signal $HSW_1$ is supplied to not only the switch 64, but also switch 66 or 68, through flip-flop $284_1$ or $284_2$. At this time, head switching pulse signal $HSW_1$ is to control switch 66 or 68 respectively, as head switching pulse signal $HSW_{21}$ or $HSW_{22}$, through flop-flop $284_1$ or $284_2$.

And the image signal output from the switch 64 is reproduced in image signal before recording, after audio signal has been removed and the treatments of demodulation and so forth have been made by reproductive image signal processing circuit 70 containing filter removing reproductive audio signal. On the one hand, audio signal is output to reproductive audio signal processing circuits 326 and 328 containing filter taking out only reproductive audio signal from the switches 66 and 68. The audio signal is output also from A/D converter 54, after the audio signal has been taken out by reproductive audio signal processing circuits 326 & 328 and its band limiting and demodulation treating have been made. The illustration is skipped, because the circuits constitution of other parts are the same as the second embodiment as shown in FIG. 9 and the whole operation is the same as the second embodiment too, except that many kind of filter apparatus are provided with on reproductive image signal processing circuit 70 and reproductive audio signal processing circuits 326 and 328.

The sampling number of noise is decreased as much as possible and noise removing ability can be improved, owing to the constitution in which the head switching operation causing generation of noise is phase-synchronized with sampling timing of analog signal, as illustrated above.

Moreover, high frequency components can be restored favorably because the period of sampling is shortened.

What is claimed is:

1. An analog signal synthesizing processing circuit with a periodic noise compensation, said circuit comprising:
    synthesizing means for synthesizing a plurality of audio signals supplied from a reproduction device for reproducing a plurality of analog signals containing noise being generated almost periodically;
    phase synchronizing means for synchronizing a synthesizing operation of said synthesizing means with a given sampling clock signal;
    analog-digital converting means for converting an analog signal output from said synthesizing means into a digital signal in response to said sampling clock signal supplied to said phase synchronizing means;
    signal output approximating means for approximating said noise contained in said converted signal obtained by said analog-digital converting means with reference to both preceding and following signals in response to said sampling clock signal; and
    digital-analog converting means for converting said approximated signal output from said signal output approximating means into an analog signal.

2. An analog signal synthesizing processing circuit with a periodic noise compensation, said circuit comprising:
    signal oscillating means for generating a plurality of analog signals containing noise being generated almost periodically, said signal oscillating means having at least two heads which slide on a magnetic tape to trace a track on the magnetic tape;
    synthesizing means for synthesizing a plurality of analog signals containing said noise generated by said signal oscillating means, said synthesizing means including a switch for switching said heads;
    phase synchronizing means for synchronizing a synthesizing operation of said synthesizing means with a given sampling clock signal;
    analog-digital converting means for converting an analog signal output from said synthesizing means into a digital signal in response to said sampling clock signal supplied to said phase synchronizing means;
    signal output approximating means for approximating said noise contained in said converted signal obtained by said analog-digital converting means with reference to both preceding and following signals, said signal output approximating means comprising a compensation processing circuit; and
    digital-analog converting means for converting said approximated signal output from said signal output approximating means into analog signal.

3. An analog signal synthesizing processing circuit according to claim 2, wherein;
    said sampling clock signal is supplied from timing signal oscillating means.

4. An analog signal synthesizing processing circuit according to claim 3, wherein;
    said phase synchronizing means comprises at least one flip-flop circuit and at least one delay circuit.

5. An analog signal synthesizing processing circuit according to claim 3, wherein;
    said phase synchronizing means contains clock-controlled delay circuit.

6. An analog signal synthesizing processing circuit according to claim 3, wherein;
    said phase synchronizing means comprises delay circuit, counter which is supplied with output signal from said delay circuit and sampling clock signal from said timing signal oscillating means, and decoder which outputs signal in response to said counter.

7. An analog signal synthesizing processing circuit according to claim 3, wherein;
    said phase synchronizing means comprises delay circuit, flip-flop circuit and integration circuit.

8. An analog signal synthesizing processing circuit with a periodic noise compensation, said circuit comprising:
    signal oscillating means for generating a plurality of analog signals containing noise being generated almost periodically, having at least two heads which slide on a magnetic tape to trace a track on the magnetic tape;
    synthesizing means for synthesizing a plurality of analog signals containing noise generated by said signal oscillating means which is a switch for switching said heads;
    timing signal oscillating means for supplying a predetermined sampling clock signal;
    phase synchronizing means for synchronizing a synthesizing operation of said synthesizing means with said sampling clock signal, having at least one flip-flop circuit and at least one delay circuit;
    analog-digital converting means for converting analog signal output from said synthesizing means into digital signal in response to said sampling clock signal supplied to said phase synchronizing means;

signal output approximating means for approximating said noise contained in converted signal obtained by said analog-digital converting means with reference to both preceding and following signals, said signal output approximating means comprising interpolation data inserting means for replacing said noise with interpolation data, memory means for memorizing said interpolation data, interpolation data detecting means for detecting supplied interpolation data read out by said memory and least square approximation means for correcting by least square approximating said noise section in response to interpolation timing signal detected by said interpolation data detecting means; and digital-analog converting means for converting approximated signal output from said signal output approximating means into analog signal.

9. An analog signal synthesizing processing circuit according to claim 8, wherein;

said synthesizing means switches a plurality of analog signals selectively and synthesizes.

10. An analog signal synthesizing processing circuit according to claim 9, wherein;

said analog-digital converting means converts two signals output from said synthesizing means mutually.

11. An analog signal synthesizing processing circuit according to claim 9, wherein;

said phase synchronizing means synchronizes said switching operation with the phase of said sampling clock signal supplied from said timing signal oscillating means.

12. An analog signal synthesizing processing circuit with a periodic noise compensation, said circuit comprising:

signal oscillating means for generating a plurality of analog signals containing noise being generated almost periodically, having at least two heads which slide on a magnetic tape to trace a track on the magnetic tape;

synthesizing means for synthesizing a plurality of analog signals containing noise generated by said signal oscillating means, which is a switch for switching said heads;

timing signal oscillating means for supplying a predetermined sampling clock signal;

phase synchronizing means for synchronizing a synthesizing operation of said synthesizing means with said sampling clock signal, having a delay circuit, a flip-flop circuit, and an integrated circuit;

analog-digital converting means for converting analog signal output from said synthesizing means into digital signal in response to said sampling clock signal supplied to said phase synchronizing means;

signal output approximating means for approximating said noise contained in converted signal obtained by said analog-digital converting means with reference to both preceding and following signals, said signal output approximating means comprising interpolation data inserting means for replacing said noise with interpolation data, memory means for memorizing said interpolation data, interpolation data detecting means for detecting supplied interpolation data read out by said memory and least square approximation means for correcting by least square approximating said noise section in response to interpolation timing signal detected by said interpolation data detecting means; and digital-analog converting means for converting approximated signal output from said signal output approximating means into analog signal.

13. An analog signal synthesizing processing circuit according to claim 12, wherein;

said synthesizing means switches a plurality of analog signals selectively and synthesizes.

14. An analog signal synthesizing processing circuit according to claim 13, wherein;

said analog-digital converting means converts two signals output from said synthesizing means mutually.

15. An analog signal synthesizing processing circuit according to claim 13, wherein;

said phase synchronizing means synchronizes said switching operation with the phase of said sampling clock signal.

* * * * *